US012776232B2

(12) United States Patent
Campbell

(10) Patent No.: US 12,776,232 B2
(45) Date of Patent: Oct. 27, 2026

(54) APPARATUS FOR MOUNTING AND INFORMATION DISPLAY

(71) Applicant: Bruce Campbell, Ashland, OR (US)

(72) Inventor: Bruce Campbell, Ashland, OR (US)

( * ) Notice: Subject to any disclaimer, the term of this patent is extended or adjusted under 35 U.S.C. 154(b) by 111 days.

(21) Appl. No.: 18/599,742

(22) Filed: Mar. 8, 2024

(65) Prior Publication Data

US 2025/0285562 A1 Sep. 11, 2025

(51) Int. Cl.
*G09F 7/18* (2006.01)

(52) U.S. Cl.
CPC ........ *G09F 7/18* (2013.01); *G09F 2007/1856* (2013.01)

(58) Field of Classification Search
CPC . G09F 7/18; G09F 2007/1856; A47B 73/004; A47F 7/12; A47F 7/10; A47F 7/0021; A47F 7/0028; Y10T 24/13; Y10T 24/15; Y10T 24/155; Y10T 24/158; Y10T 24/23; Y10T 24/3916; Y10T 24/44222; Y10T 24/44223
See application file for complete search history.

(56) References Cited

U.S. PATENT DOCUMENTS

D204,342 S * 4/1966 Larkin .......................... D6/316
3,398,839 A * 8/1968 Ballenger ................. A47F 7/24 211/85.15
3,603,551 A * 9/1971 Peterson .................. B25H 3/04 248/314
4,515,420 A * 5/1985 Grosch .............. G11B 33/0438 312/234.4
D311,458 S * 10/1990 La Croix ........................ D6/315
5,947,349 A * 9/1999 Shaalan ................ D06F 89/023 223/87
6,102,199 A * 8/2000 Ho ......................... B42D 5/005 206/214
6,769,555 B2 * 8/2004 Brady .................. A47G 25/743 211/89.01
2003/0106250 A1 * 6/2003 Best .......................... G09F 3/02 40/673
2010/0187256 A1 * 7/2010 Draisma .............. B65D 23/065 40/310

FOREIGN PATENT DOCUMENTS

GB 2255958 A * 11/1992 ............... G09F 3/04

* cited by examiner

*Primary Examiner* — Cassandra Davis

(57) ABSTRACT

The present invention is directed to an apparatus for a mounted information display that may comprise a sign body that may be configured to have a front side, a back side, a plurality of edges, which may include a top edge, bottom edge, and a plurality of side edges depending on the shape of the body, a cutout, a flexible material that may be positioned within the cutout, an opening in the flexible material, wherein the opening in the flexible material may form a plurality of flaps to fit snuggly around another object such as, for example, a door handle. The configuration of the present invention may solve issues relating to signage falling off or being insufficiently mounted on objects, such as a door handle while also being easily detachable.

4 Claims, 6 Drawing Sheets

APPARATUS FOR MOUNTING AND INFORMATION DISPLAY

GOVERNMENT CONTRACT

Not applicable.

CROSS REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The present invention relates to the design of mounted and detachable information displays.

BACKGROUND

Existing do not disturb signs, commonly used in hotels and offices, often encounter several challenges that limit their effectiveness and convenience. One of the primary issues with traditional do not disturb signs is their tendency to fall off door handles when the door is opened and closed. This problem stems from there being no simple solution to securely attach a sign to a door handle. The lack of a secure attachment means that any movement of the door can easily dislodge the sign, leading to frequent replacements and the potential for the sign to be missed by staff or visitors, defeating its purpose.

Another disadvantage of traditional signs is their lack of versatility. Designed to fit standard door handles, these signs often struggle to accommodate the variety of handle designs found across different buildings and facilities. For example, larger or unconventionally shaped handles may not hold the sign properly, if at all, which limits the sign's utility in diverse environments.

The lack of adaptability in the design of traditional do not disturb signs also means they cannot provide a snug fit around the door handle, which not only contributes to the risk of the sign falling off but also can result in the sign swinging or rotating on the handle. This movement can make the sign less visible or legible, especially if it rotates to face the door instead of outward.

For the foregoing reasons, there is a need for a solution that allows prevents falling from the intended location that works to be mounted with differing objects such as varying door handle shapes and sizes.

SUMMARY

The introduction of the present invention which may, in some embodiments, be configured with an opening and a flexible material addresses the problem of signs falling of being improperly aligned when mounted with or on various shaped objects. The flexible material of the present invention can conform to, for example, various door handle shapes and sizes, providing a snug fit that significantly reduces the likelihood of a sign falling off. This adaptability extends the utility of the sign to a broader range of environments and door handle designs, enhancing its effectiveness. Additionally, the use of durable and flexible materials can increase the lifespan of the sign, reduce waste, and maintain a professional appearance over time, addressing the disadvantages associated with traditional information display signs.

The apparatus for mounting an information display is an innovative solution tailored to display messages conveniently at points of entry or passage. In some embodiments this device may designed to securely attach to various door handle mechanisms, offering a versatile and reliable method for presenting information.

A main component of the apparatus may be the sign body, which may serve as a display surface. The front side of the sign may be configured to hold a message or graphic, making it immediately visible upon approaching a structure wherein the apparatus is hanging, such as, for example, a door handle. In some embodiments, the reverse side may reinforce the structure and may also be used for supplementary information or branding purposes.

The peripheral design of the sign involves carefully finished edges—two side edges, a top edge, and a bottom edge—each refined to prevent accidental snags and to maintain the sleek appearance of the device. The top edge is of particular importance as it integrates with the upper cutout, which is a key feature of the apparatus's attachment mechanism.

Within the cutout, it may be contemplated to embed a section of flexible, durable material. This material, which may be chosen for its elasticity and strength, could be tailored with an opening that might accommodate door handles of various sizes and shapes. In certain embodiments, a series of flaps around this opening could allow the material to expand or contract, which may ensure that the apparatus fits snugly against the handle, potentially reducing movement, and possibly preventing the sign from dislodging during door operation.

The design of the apparatus might emphasize ease of use and adaptability. It could be that the flexible material and flaps enable a one-size-fits-all application, which might eliminate the need for different sign variations for different door handles. This universality could make the apparatus for mounted information display a potentially efficient tool for environments where interchangeable messaging is necessary, such as, for example, offices, educational institutions, or residential complexes.

Durability may be a critical aspect, with materials possibly chosen to endure frequent handling and environmental changes. This might ensure that the apparatus remains functional over time, thereby providing a potential long-term solution for information display needs.

In essence, the apparatus for mounted information display may be seen as an exemplar of user-focused design combined with functionality that eliminates issues such as the display falling off a door handle when the door is opened or closed, potentially offering a blend of robustness, versatility, and ease of use, and making it a tool for communication in a multitude of settings.

DETAILED DESCRIPTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
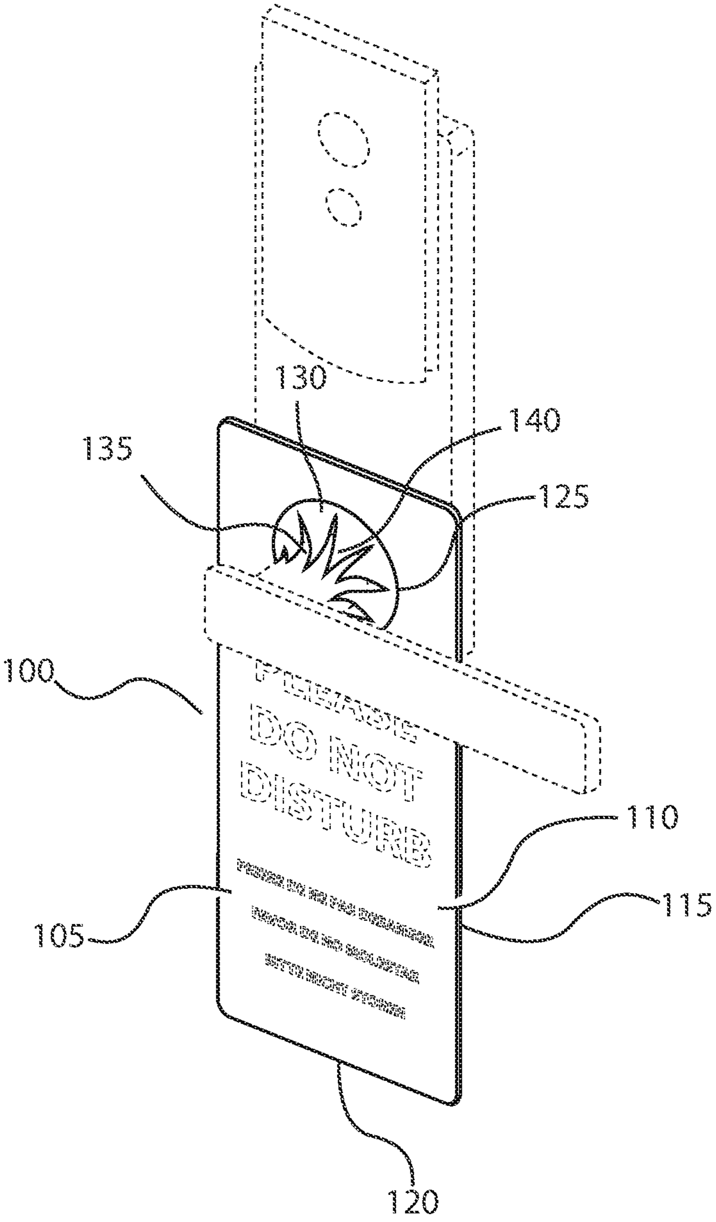
FIG. 1 shows a perspective angle view of the present invention in an embodiment that is depicted mounted on a door handle.

Referring to FIG. 1, in similar embodiments the apparatus for a mounted information display 100 may comprise a sign body 105 that may be configured to have a front side 110, back side 115, a plurality of edges 120, which may include a top edge, bottom edge, and a plurality of side edges depending on the shape of the body, a cutout 125, a flexible material 130 that may be positioned within the cutout, an opening 135 in the flexible material 130, wherein the opening 135 in the flexible material 130 may form a plurality of flaps 140 to fit snuggly around another object such as, for example, a door handle.

Figure 2:
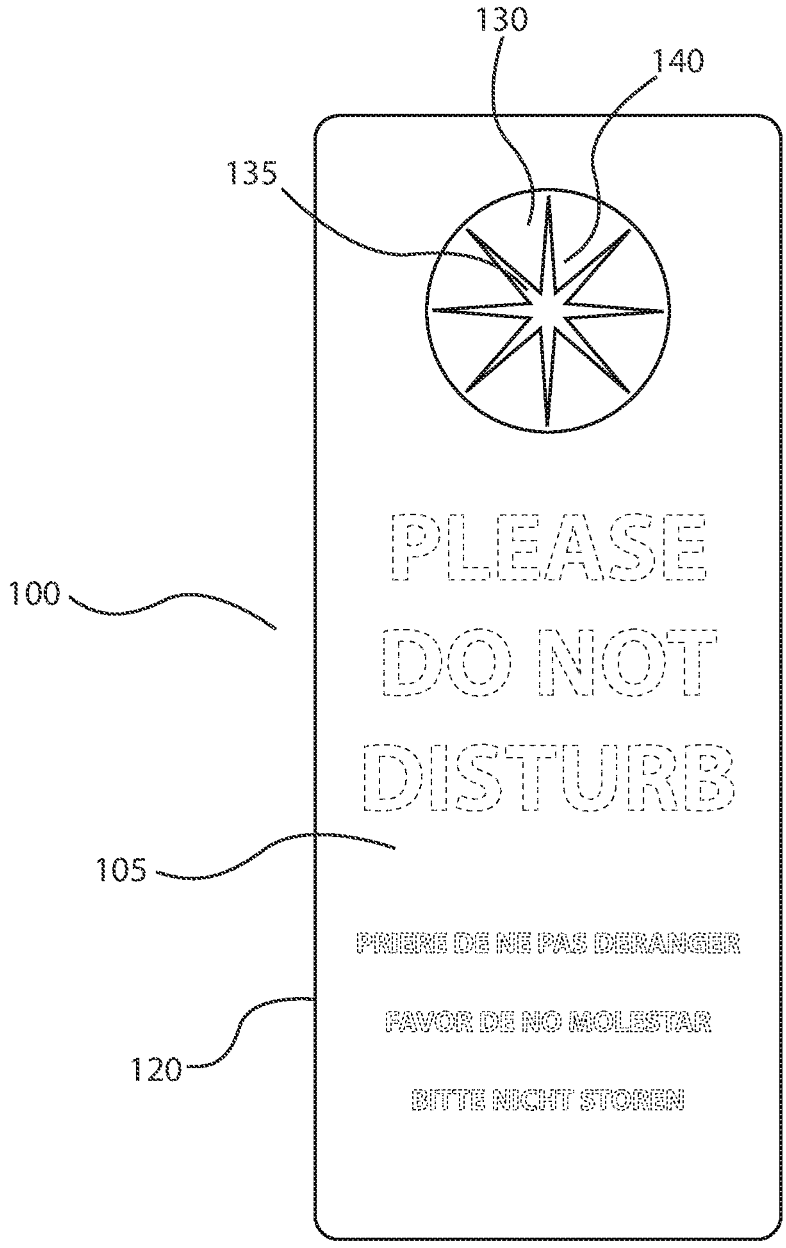
FIG. 2 shows a front side view of the present invention.

Referring to FIG. 2, in many embodiments the present invention may be in a form that is detachable and attachable to certain objects, such as, for example door handles and the like. In the embodiments ad depicted in FIG. 2 the figure shows the present invention in a detached state from a front perspective view wherein the apparatus may comprise a plurality of edges 120, a flexible material, 130, a plurality of flaps 140, and an opening 135 in the flexible material 130.

Figure 3:
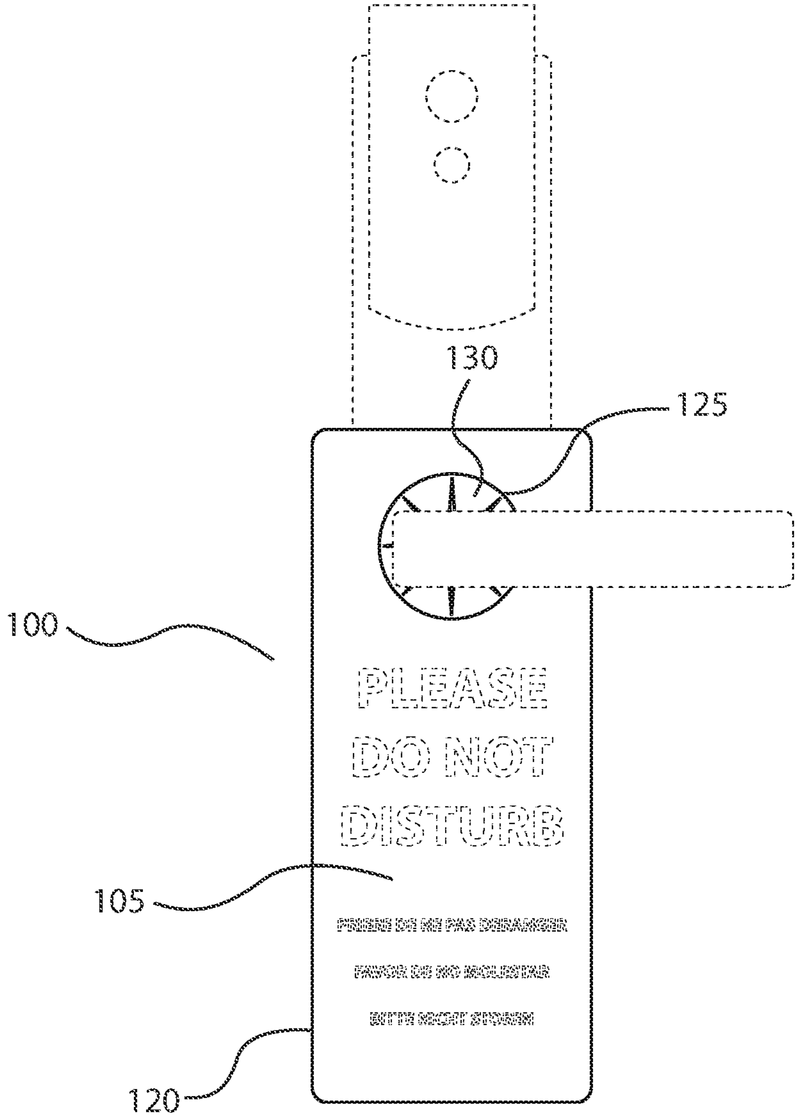
FIG. 3 shows a front side view of the present invention in an embodiment that is depicted mounted on a door handle.

Referring to FIG. 3, in similar embodiments to FIG. 2, the apparatus may hang and be mounted on objects such as, for example, door handles, as depicted in FIG. 3. In similar embodiments to FIG. 3, the apparatus may comprise a body 105 with plurality of edges 120, a flexible material 130, a plurality of flaps 140, and an opening 135 in the flexible material 130 that may be utilized to wrap around or stretch around an object that it is being attached to when in use.

Figure 4:
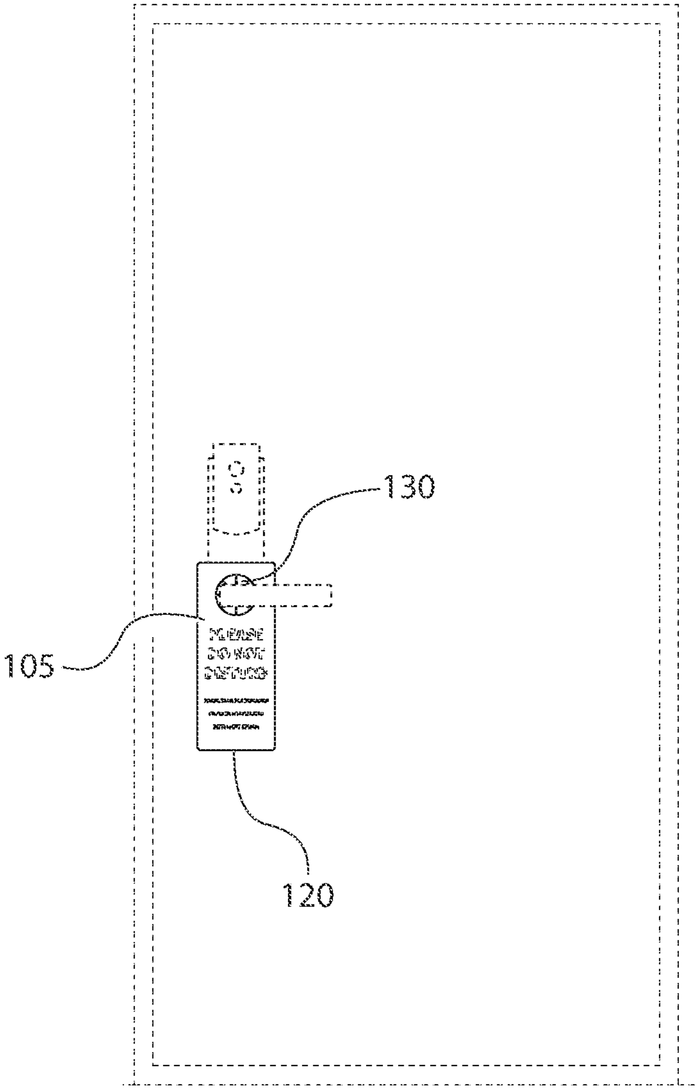
FIG. 4 shows a front side wide view of the present invention in an embodiment that is depicted mounted on a door handle that may provide the scale of the present invention in certain embodiments in comparison to the size of a door frame.

Referring to FIG. 4, the apparatus may be of a size that is convenient to be mounted on a door without hitting the edge of a door frame when opened, in similar embodiments to FIGS. 2 and 3, the apparatus may hang and be mounted on objects such as, for example, door handles, as depicted in FIGS. 2 and 3. In similar embodiments, the apparatus may comprise a body 105 with plurality of edges 120, a flexible material 130, a plurality of flaps 140, and an opening 135 in the flexible material 130 that may be utilized to wrap around or stretch around an object that it is being attached to when in use.

Figure 5:
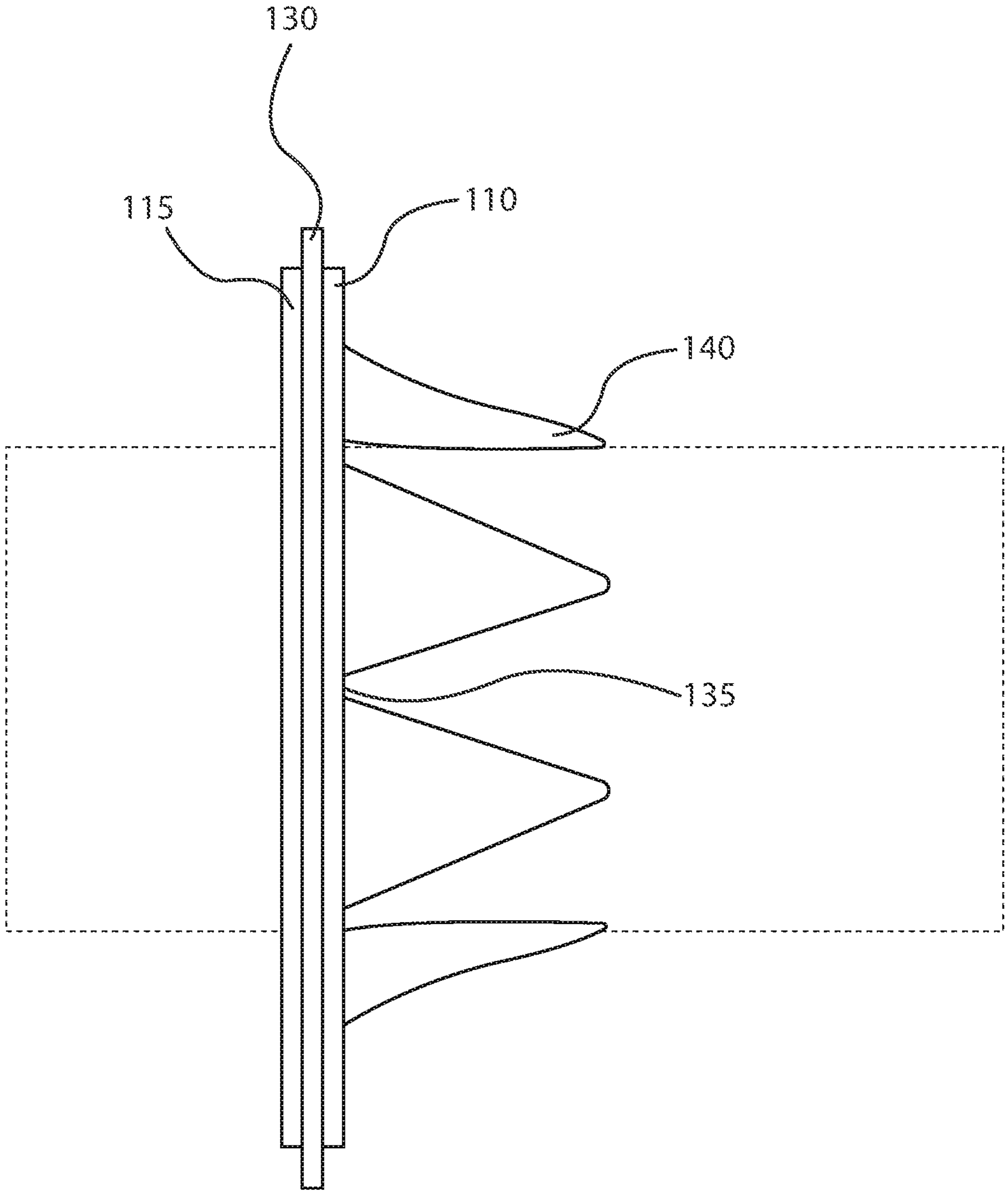
FIG. 5 shows a top cutout perspective of certain embodiments of the attachment feature depicted being mounting around an object.

Referring to FIG. 5, the present invention may be comprised of multiple layers of materials such as the front side 110, the back side 115, and the flexible material 130 wherein the flexible material may be configure do be pressed and sealed between the front side 110 and back side 115 to keep in in place and create enough resistance to assure that the flexible material 130 may stretch around objects without coming loose from the apparatus body 105.

In some embodiments, the present invention may include an information display that may be mounted or integral with a sign body 105 that may include various display components. The sign body 105 and various display components may be configured to have a plurality of display surfaces. In certain embodiments, for example, such display surfaces may be on a front side 110 and back side 115 of the sign body 105. In many embodiments, a structural reinforcement and information surface may be included to reinforce the structure, which may be internal to the sign body 105, or on one or more outside surfaces of the sign body 105, which may provide primary or supplementary information for display in connection with the sign body 105.

In many embodiments, the present invention may include a feature that may be configured to integrate within the sign body 105. In some embodiments, the attachment feature may be made of a flexible and durable material, which is often configured to be embedded within the attachment feature and may be tailored with an opening 135 forming an accommodating feature to accommodate various attachment objects, such as, for example, door handles of various sizes. Additionally, the accommodating feature may be an opening 135 that forms a series of flaps configured to accommodate various attachment objects.

In some embodiments, the accommodating feature may include an expansion and contraction feature configured in a manner that enables the flexible and durable material to expand or contract for the purpose of accommodating the various attachment objects. In certain embodiments, the expansion and contraction feature may be integral with the opening 135 of the accommodating feature and such an opening 135 may be cut in various shapes, such as a circle, a series of slits, a plurality of triangle flaps, a star configuration, or any variety of opening 135 shapes to accommodate different attachment objects, including, without limitation door handles of different shapes and sizes, edges of tables, chairs, office cubicles, bed posts, among other objects that may need to display information.

In some embodiments the structural reinforcement and information surfaces may comprises two parts that may be bonded together to reinforce the sign body 105 from both the front side 110 and reverse side of the sign. Additionally, in many embodiments the flexible and durable element may be sealed in place between two of such forementioned structural reinforcement and information surface parts.

In many embodiments, the attachment feature may be configured to be located on the upper half of the sign body 105 so as to allow the sign body 105 to hang below the attachment object that it is attached to or in some other embodiments it may be located elsewhere to provide a surface area for display of information dependent on the object that it is attached to. In many embodiments the attachment feature may be of a durability and strength so if the sign body 105 were to be rotated in any direction it would remain in place without falling or rotating to a different placement in relation to an attachment object.

Figure 6:
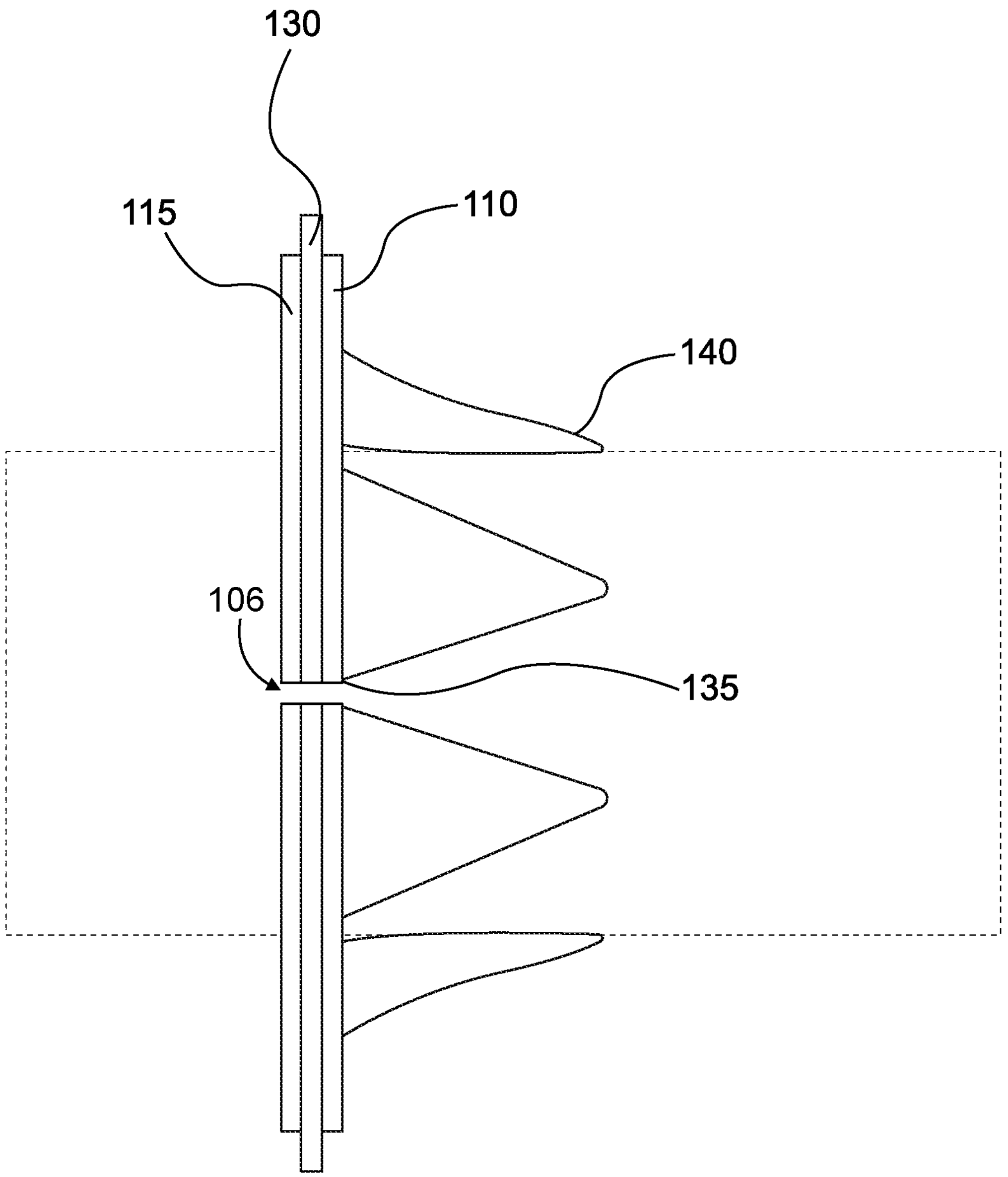
FIG. 6 shows another top cutout perspective of certain embodiments of the attachment feature depicted being mounting around an object.

In some embodiments the attachment feature may be configured either entirely within side walls of the sign body 105 or as in FIG. 6, may be configured to be integral with an outer edge of the sign body 105 forming an inlet 106 or slit in connection with the sign body 105 walls.

The body 105 of the apparatus for a mounted information display may be constructed in various shapes and sizes to accommodate a wide range of functional and aesthetic requirements. For instance, the body 105 could be rectangular for conventional door signage, or it might be circular or oval to provide a more modern and sleek appearance. The possibility exists for the body 105 to be tailored into a custom shape, such as an arrow or a unique geometric pattern, which may capture attention or align with specific branding guidelines.

In certain embodiments, a smaller apparatus body 105 may be beneficial for personal office doors or cubicles where space is limited, while a larger body 105 could serve well in more spacious areas like the entrances to conference rooms or lobbies to ensure visibility from a distance. The shape might also be reflective of the use-case scenario; for example, a sign with a pointed end may be utilized to direct traffic flow in corridors, whereas a square or round sign could denote a static message such as an occupancy status.

Different shapes may also be useful in various situations to convey the importance or nature of the information displayed. For instance, a sign with rounded edges 120 may present a softer, more welcoming message, appropriate for environments like therapy centers or spas. In contrast, a sign with sharp, angular edges 120 could denote a more urgent or formal message, suitable for legal or financial institutions.

Moreover, the adaptability in shape and size of the apparatus body 105 allows for the use in specialized situations such as on the doors of vehicles in transportation services, where a sign might need to conform to smaller or irregularly shaped door handles. Additionally, a compact and discreet sign might be preferable in high-end hospitality settings, where elegance and subtlety are paramount.

The materials used for the body 105 may vary to suit different environmental conditions or aesthetic choices, ranging from durable plastics for high-traffic areas to brushed metals for a more upscale look. The versatility in the design may facilitate the apparatus's integration into a multitude of settings, ensuring that it remains a relevant and adaptable choice for door mounted information display.

The front side 110 and back side 115 of the apparatus for mounted information display may be configured to serve distinct purposes or to be interchangeable. In reversible configurations, both sides could be utilized to display information, which may be beneficial in scenarios where dual messaging is required. For example, one side might display a "Welcome" message, while the reverse side could indicate that privacy is requested, such as "In Session" or "Do Not Disturb." This feature might be particularly useful in environments such as medical offices, therapy centers, or meeting rooms, where the status of the room can change frequently.

Alternatively, the apparatus might not be reversible in certain embodiments. In such instances, the front side 110 would be the primary focus for display purposes, perhaps featuring more intricate designs, colors, or branding elements. The back side 115, in this case, could be reserved for manufacturer information, instructions for use, or could even remain blank. A non-reversible configuration may be preferable in settings where information is static or a one-way communication is sufficient, such as safety signs or identification placards outside of conference rooms or classrooms.

Different configurations of the front side 110 and back side 115 could prove useful in various situations. For instance, in a hotel setting, a reversible sign might allow guests to communicate with housekeeping staff—displaying either "Please Clean Room" or "Do Not Disturb." On the other hand, in a retail environment, a non-reversible sign might be used to display opening 135 hours on the front, while the back remains unseen and utilitarian.

Furthermore, the apparatus might be designed with a detachable or slide-in panel feature, where the front side 110 and back side 115 are interchangeable by simply flipping or exchanging the panels. This could provide flexibility for temporary events or promotions, where the displayed information needs to be updated or changed out regularly.

The materials used for the front side 110 and back side 115 may vary based on the intended use. For reversible signs, a robust material that can withstand frequent handling, like a thick laminated card or a light metal, might be used. For non-reversible signs, where one side may be less exposed to wear and tear, a combination of materials—like a high-quality finish on the front and a more cost-effective material on the back—could be employed.

The configuration of the front side 110 and back side 115 of the apparatus for mounted information display may be adapted to suit a myriad of uses, providing a versatile solution for information dissemination in both personal and professional settings.

The body 105 of the apparatus for mounted information display may be comprised of materials such as plastics, which offer lightweight and cost-effective benefits, and can be easily customized in terms of transparency, color, and shape. This makes plastic particularly suitable for a variety of indoor settings. Alternatively, metals like aluminum, stainless steel, or brass might be chosen for their durability and premium aesthetic, which could be ideal in more demanding environments or where a higher-end look is desired. Wood may be used for its natural aesthetic, aligning with eco-friendly or boutique atmospheres.

The front side 110, serving as the primary display area, may utilize laminates to protect against wear and facilitate easy cleaning, or it could feature a dry-erase or chalkboard finish to allow for easily changeable messaging. Tempered glass could also be an option for a modern appearance and the utility of erasable markers, particularly suited to corporate or upscale retail environments.

For the back side 115, if not used for display, a more economical material might be appropriate to reduce costs while maintaining functionality. This side could also feature an adhesive or magnetic backing if the apparatus is intended to hold additional notes or papers.

The materials used in the apparatus not only contribute to the overall utility by affecting factors such as weight and durability but also play a significant role in the cost-effectiveness and aesthetic appeal of the product. The utility provided by the chosen materials may vary; for example, a durable metal sign might be used outdoors for its resistance to weather, while a plastic sign could be preferred indoors for its lighter weight and ease of handling. The method of displaying the message may also influence material choice, with options like engraving for metal and printing for plastic offering different benefits. Balancing the intended use, message change frequency, environmental conditions, and budget will ultimately determine the most appropriate materials for the apparatus for mounted information display in its specific application.

The cutout 125 portion of the apparatus for mounted information display is an integral feature that may be variably positioned and sized to enhance the device's adaptability. It could be located at the traditional top center of the body 105 for a standard door handle hang, or it might be situated on the side or even the bottom, depending on the unique door mechanics or user preference. This flexibility in the placement of the cutout 125 allows the apparatus to be tailored to different operational contexts or aesthetic desires.

The shape of the cutout 125 is another aspect that may be varied. It could be a simple circle or oval to accommodate traditional round doorknobs, or it could be a more elongated shape for lever-type handles. In certain environments, the cutout 125 might need to fit over larger or unconventionally shaped handles, requiring a custom design. The size of the cutout 125 is similarly important; it may be small for snug fits or larger to ensure compatibility with a wide range of door handle sizes.

Different situations call for different configurations of the cutout. In a high-traffic area where doors are frequently used, a tighter fit might be desirable to ensure the sign remains securely in place. Conversely, in a setting where the sign needs to be swapped out regularly, a larger cutout 125 could facilitate quicker and easier changes. For doors that are not standard, such as those in historic buildings or specialized industrial environments, the cutout 125 might be specifically tailored to match the unique door hardware present.

The cutout's adaptability not only serves functional purposes but may also contribute to the overall design appeal of the apparatus. For instance, a heart-shaped cutout 125 could be employed in a boutique hotel to add a touch of whimsy, or a sleek, narrow cutout 125 might be used in a modern office setting to align with contemporary decor. This customization capability may allow the apparatus to blend seamlessly into the environment or stand out as a statement piece, as desired by the user or dictated by the application.

Within the cutout 125 of the apparatus for door mounted information display, a flexible material 130 may be inserted to enhance the grip and stability of the sign when mounted.

This flexible material 130 is crucial for providing a snug fit around various door handles, ensuring that the apparatus remains secure even when doors are opened or closed frequently.

The material selected for this purpose may possess inherent elasticity, allowing it to stretch and conform to different handle shapes without losing its original form. For instance, silicone or rubber could be used for their durability and resilience. These materials can compress around a door handle, then expand back to their original shape, offering a tight fit and preventing slippage.

In certain situations, other materials may be more appropriate. For example, foam might be used for its cushioning properties in an environment where noise reduction is essential, such as in a library or hospital setting. In contrast, a thermoplastic elastomer could be selected for its ability to withstand extreme temperatures, making it suitable for outdoor use or in industrial settings.

The utility provided by the flexible material 130 within the cutout 125 is multifaceted. Not only does it hold the sign body 105 in place more securely, but it also contributes to the longevity of the sign by minimizing wear and tear on both the sign and the door handle. The choice of material may be dictated by factors such as the frequency of sign changes, the type of environment (indoor vs. outdoor), and the level of grip required. The material's texture and color can also be considered to match the aesthetic or branding requirements of the setting where the apparatus is used.

The flexible material 130 within the cutout 125 of the apparatus for mounted information display serves as a customizable element that significantly enhances the sign's functionality. Its ability to adapt to various situations and requirements makes it a valuable component of the overall design.

The opening 135 within the flexible material 130 of the apparatus for mounted information display 100 is a pivotal feature that may be crafted in a variety of shapes to optimize the device's secure attachment to door handles or other fixtures. This opening 135 can be tailored not only to fit the aesthetic preferences but also to enhance the grip based on the handle's design it will be affixed to.

For example, an opening 135 in the shape of a star may create a series of triangular-shaped flaps 140 in the flexible material. These flaps, due to their geometric design, could potentially provide a more secure engagement with handles that have irregular shapes or require a more intricate grip. The pointed tips of the triangles can dig slightly into softer handle materials, like certain plastics or woods, thereby reducing the risk of slippage.

Alternatively, the opening 135 could be a simple circle or square, which might be sufficient for standard door handles and would provide a uniform distribution of tension around the circumference of round knobs or the straight edges of lever handles. A circular opening 135 could also offer a more universal fit, accommodating a wide variety of handle sizes.

In some instances, a slit or cross-shaped opening 135 might be employed to accommodate handles with wider diameters or unique profiles, allowing the material to stretch and accommodate the extra width while still gripping securely when the handle narrows.

The choice of opening 135 shape is also influenced by the material's properties. For materials with higher elasticity, more intricate shapes can be used without concern for the material tearing or losing its shape. Conversely, for less elastic materials, simpler shapes might be preferable to ensure longevity and maintain a firm hold.

Moreover, the opening 135 shape can contribute to the ease of installation of the apparatus. A complex shape might require more careful alignment when placing the sign, while a simpler shape could be more user-friendly, allowing for quick and effortless placement.

In sum, the opening 135 in the flexible material 130 of the apparatus for mounted information display is designed to be versatile, accommodating different door handle designs and usage scenarios. The shape of the opening 135, whether it be a star, circle, square, slit, or cross, may be selected based on the specific requirements of the environment in which the apparatus will be used, balancing functionality, ease of use, and aesthetic considerations.

In certain embodiments of the apparatus for door mounted information display, the opening 135 in the flexible material 130 is structured to form a plurality of flaps. These flaps 140 may be designed to engage with the contours of a door handle or any fixture it is mounted upon, providing a secure fit. The number, size, and shape of these flaps 140 can vary depending on the design. For instance, triangular flaps 140 resulting from a star-shaped opening 135 may be preferable for their ability to conform to and grip various handle shapes, whereas rounded flaps 140 from a circular opening 135 might offer a more consistent and gentle pressure around standard round knobs.

The flaps 140 function by slightly bending or flexing to accommodate the shape and movement of the door handle. This flexibility allows for a snug fit that adapts to the handle's dimensions, reducing lateral movement and the likelihood of the sign slipping off. In some cases, the flaps

140 may have a textured surface to enhance grip, or they might be coated with a non-slip material to further secure the apparatus in place.

On the other hand, in embodiments where the opening 135 in the flexible material 130 does not form flaps, the opening 135 itself is designed to secure the apparatus. The opening 135 could be a simple, non-structured cutout 125 that stretches to fit the handle. This could be the case with materials that have high tensile strength and elasticity, where the material's inherent grip is sufficient to hold the apparatus in place without the need for additional structures like flaps.

Alternatively, the opening 135 might be reinforced with a rigid or semi-rigid ring embedded within the flexible material. This ring could clamp around the handle, providing a different method of attachment that relies on the tension or the friction between the ring and the handle. Such a design might be used in situations where the handles are not standard or where a more permanent and less flexible mount is desired.

The choice between having flaps 140 or a simple opening 135 may be contingent upon factors such as the expected frequency of sign changes, the type of environment (indoor or outdoor), the variety of handles encountered, and the desired ease of installation. Each design offers different advantages and may be chosen to best meet the specific needs of the setting in which the apparatus will be employed.

The design of the cutout 125 with flexible material 130 within the apparatus for mounted information display can be adapted to enhance its versatility beyond traditional door handle applications. This flexibility allows the apparatus to be mounted on a variety of objects, expanding its utility across different environments.

In some embodiments, the cutout 125 containing the flexible material 130 could be situated entirely within the body 105 of the apparatus. This design means that the cutout 125 does not reach the edge of the apparatus body 105 but is instead enclosed, forming a sort of pocket or loop within the body 105 itself. Such a configuration could be particularly useful for hanging the apparatus on objects that do not have a protruding handle or where a more secure attachment is required. For example, it could be looped over the top of a cubicle partition, chair back, or a rail, where the flexibility of the material allows it to stretch over and grip the object securely, while the enclosed design prevents it from slipping off easily.

Alternatively, the cutout 125 with flexible material 130 could start from the side of the apparatus body 105, extending inward. This design creates an open-ended slot that can be slid onto objects with wider or fixed bases that would not pass through a completely enclosed loop. Such an approach could be ideal for attaching the apparatus to thicker objects like the sides of bookshelves, exercise equipment, or even the armrests of seating in public areas. This design allows for a broader range of objects to be accommodated, as the slot can be adjusted in width to fit snugly around various thicknesses, ensuring the apparatus remains in place.

Both designs offer distinct advantages depending on the application. The completely enclosed cutout 125 provides a secure hold for objects where the apparatus might otherwise slide off, suitable for vertical or sloped surfaces. The open-ended design, on the other hand, offers flexibility for use on a wider range of objects, including those with non-removable bases or larger diameters.

Incorporating flexible material 130 into these cutouts ensures that the apparatus can conform to and grip different surfaces securely, reducing the risk of slippage or displacement. This adaptability makes the apparatus for mounted information display a highly versatile tool, capable of serving various signaling or informational needs in diverse settings.

The manufacturing of each element of the apparatus for the mounted information display may involve various processes to ensure that the final product is both functional and aesthetically pleasing.

The body 105 of the apparatus could be manufactured using processes such as injection molding for plastic materials, which allows for precise shapes and sizes to be created in large quantities. For metal bodies, die-casting or stamping might be used, followed by finishing processes such as polishing or anodizing for durability and appearance. Wood bodies may be crafted through CNC routing for precision and then sanded and sealed.

The front side 110 and back side 115 of the apparatus, if made from similar materials, might follow the same manufacturing process as the body 105. Printing, engraving, or embossing may be applied to add text or designs. If the sides are intended to be interchangeable, identical processes would be used for both sides. For sides not meant to be reversible, the back side 115 might be left blank or have a simpler finish.

The cutout 125 may be laser-cut or stamped from the body 105 material, allowing for clean edges and precise dimensions. The flexible material 130 for the cutout 125 may be molded or die-cut to the desired shape, incorporating the necessary openings 135 or flaps 140. This part would be designed to fit snugly within the cutout 125 area of the body 105. The flaps, if present, may be part of the flexible material 130 and created during the molding or cutting process. If the design calls for a reinforced opening 135 without flaps, a rigid or semi-rigid ring may be integrated during the molding stage of the flexible material.

In the final assembly, the flexible material 130 may be secured within the cutout 125 of the body 105. This could be achieved through adhesive bonding, heat welding, or a mechanical fit where the material snaps into place. For reversible designs, the front side 110 and back side 115 may be identical and part of the body 105 itself or bound with the body 105 with an adhesive, alternatively, the front and back may be separate parts that may be attached to the body 105 in a removable manner with, for example, clips, magnets, slides, snapping buttons, or other attachment mechanisms that allow for easy changing of the sides.

To use the apparatus for door mounted information display, an individual might begin by selecting the appropriate side of the apparatus to display, assuming it's a reversible model with different messages or graphics on each side. They would then hold the apparatus by its body 105, align the cutout 125 with the door handle, and gently fit the flexible material 130 around the handle. The flexibility of the material and the design of the opening 135 or flaps 140 would allow the apparatus to conform snugly to the handle's shape, ensuring it stays securely in place.

In a non-reversible model, the user would simply need to hang the apparatus on the door handle without concern for which side is displayed. The process would involve fitting the opening 135 over the handle, allowing the inherent tension in the flexible material 130 to grip the handle firmly.

In an office setting, the apparatus could be used to indicate the availability status of meeting rooms. One side might read, for example, "Available," wherein the reverse could read "In Use." Employees or individuals within such an office could flip the sign based on the room's occupancy, providing a clear visual indicator without the need for electronic booking systems. In hospitals or clinics, the apparatus might display messages like "Consultation in Progress" or "Please Knock Before Entering." This helps maintain patient privacy and minimizes interruptions during sensitive consultations. The apparatus's ease of use allows medical staff to quickly change the displayed message as needed. Teachers in classrooms could use the apparatus to signal when they are available for student questions or if they are in the middle of a test and cannot be disturbed. Different colors or symbols could be used on each side to communicate effectively with students at a glance. In hotels, guests could use the apparatus to inform housekeeping of their preference for privacy or room cleaning. This use would leverage the reversible feature, allowing guests to easily communicate their needs without verbal or electronic communication.

The versatility of the apparatus for mounted information display allows it to be adapted to a wide range of situations, providing a simple yet effective method for conveying information. Its design, which accommodates various door handle types through the flexible material 130 in the cutout, ensures that the apparatus can be used in virtually any setting, from professional environments to personal spaces, enhancing communication and privacy management.

The apparatus for mounted information display, given its adaptable design, can be mounted or hung on a variety of objects beyond traditional door handles, allowing for versatile use in numerous situations. For example, in office environments with open floor plans or cubicle setups, the apparatus could be hung on the edges of cubicle partitions. It could serve as a signal to colleagues about availability for discussions or concentration times, effectively managing interruptions without the need for doors.

The apparatus could be adapted for use on vehicle windows, particularly for ride-sharing cars or delivery vehicles, to display messages such as "On a Break" or "Package Delivery in Progress." This usage would help communicate with the public or clients when the driver is temporarily unavailable or occupied. In retail environments, the apparatus could be placed on furniture items like chairs or display racks to signal information about sales, reserved items, or cleaning protocols. For example, a sign could indicate that a particular display is being sanitized or that a chair is reserved for fitting room use.

In gyms or fitness centers, the apparatus could be used on exercise equipment to indicate whether a machine is out of order, has been recently sanitized, or is currently reserved. This would aid in managing equipment usage and maintaining cleanliness standards without permanent signage. In areas like parks, bus stops, or communal seating areas in malls or airports, the apparatus could be hung on the back of chairs or benches to indicate social distancing measures, cleaning schedules, or reservations.

This flexible signage solution would support public health and safety measures in communal spaces. In libraries, the apparatus could be placed on shelves to signal areas where books are being updated, sections that are temporarily inaccessible, or to highlight thematic displays. This application would help guide patrons and manage access to collections without permanent alterations. The apparatus could be used on exhibit pieces or display cases to provide information about the artwork or artifacts, such as "Do Not Touch," "Photography Prohibited," or to indicate when an exhibit is temporarily closed for maintenance.

These examples illustrate the broad utility of the apparatus for mounted information display beyond its conventional use on doors, demonstrating its potential as a versatile communication tool in a wide array of settings.

What is claimed is:

1. An apparatus for mounting an information display, comprising:

a sign body with a display component configured to act as a display surface;

a structural reinforcement and information surface configured to reinforce the apparatus and provide supplementary information;

an attachment feature configured to integrate within the sign body;

a flexible and durable element configured to embed within the attachment feature and tailored with an accommodating feature;

wherein the accommodating feature is an opening forming a series of flaps configured to accommodate various attachment objects; and an expansion and contraction feature configured to allow the flexible and durable element to expand or contract for the purpose of accommodating the various attachment objects wherein the attachment feature is configured to be integral with an outer edge of the sign body forming an inlet in the sign body.

2. An apparatus, for mounting an information display, comprising:

a sign body with a display component configured to act as a display surface;

a structural reinforcement and information surface configured to reinforce the apparatus and provide supplementary information;

an attachment feature configured to house a flexible and durable element tailored with an accommodating feature;

wherein the accommodating feature is configured to accommodate various attachment objects; and wherein the attachment feature is configured to integrate within outer edges of the sign body.

3. An apparatus for mounting an information display, comprising:

a sign body with a display component configured to act as a display surface;

a structural reinforcement and information surface configured to reinforce the apparatus and provide supplementary information;

an attachment feature configured to house a flexible and durable element tailored with an accommodating feature;

wherein the accommodating feature is configured to accommodate various attachment objects; and wherein the attachment feature is configured to be integral with an outer edge of the sign body forming an inlet in the sign body.

4. A method for making an apparatus for mounting an information display, comprising:

providing a sign body having a front side, a back side, and a message bearing surface;

printing on the message-bearing surface of the sign body a message or graphic;

providing at least one structural reinforcement and information surface;

attaching the structural reinforcement and information surface to at least one of the front side and the back side of the sign body so as to reinforce the apparatus and provide supplementary information or branding;

cutting an opening through the sign body to form an attachment feature configured to integrate with a an outer edge of the sign body;

positioning a flexible and durable element in place within the attachment feature;

sealing the flexible and durable element in place within the attachment feature between portions of the structural reinforcement and information surface; and cutting, within the flexible and durable element, an accommodating feature comprising an opening and a plurality of flaps configured to expand and contract to accommodate various attachment objects of different sizes and shapes.

* * * * *